(12) United States Patent
Yang et al.

(10) Patent No.: US 11,563,655 B2
(45) Date of Patent: Jan. 24, 2023

(54) NETWORK MONITORING APPARATUS AND METHOD THEREOF IN PROGRAMMABLE NETWORK VIRTUALIZATION

(71) Applicant: Korea University Research and Business Foundation, Seoul (KR)

(72) Inventors: Gyeongsik Yang, Seoul (KR); Minkoo Kang, Seoul (KR); Hyuck Yoo, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 17/128,353

(22) Filed: Dec. 21, 2020

(65) Prior Publication Data

US 2021/0336818 A1 Oct. 28, 2021

(30) Foreign Application Priority Data

Apr. 28, 2020 (KR) .................. 10-2020-0051783

(51) Int. Cl.
*H04L 43/062* (2022.01)
*H04L 12/46* (2006.01)
(Continued)

(52) U.S. Cl.
CPC ........ *H04L 43/062* (2013.01); *H04L 12/4675* (2013.01); *H04L 41/142* (2013.01); *H04L 43/026* (2013.01); *H04L 43/065* (2013.01); *H04L 43/14* (2013.01); *H04L 43/20* (2022.05); *H04L 45/02* (2013.01); *H04L 47/70* (2013.01); *H04L 45/56* (2013.01); *H04L 47/829* (2013.01)

(58) Field of Classification Search
CPC ... H04L 43/062; H04L 45/56; H04L 12/4641; H04L 41/142; H04L 41/046; H04L 47/2483; H04L 47/2441; H04L 45/02; H04L 47/829; H04L 47/762; H04L 47/15; H04L 47/822; H04L 47/70; H04L 47/781; H04L 47/808; H04L 43/065; H04L 43/20; H04L 41/40
See application file for complete search history.

(56) References Cited

U.S. PATENT DOCUMENTS

| | | | |
|---|---|---|---|
| 9,935,854 B2 * | 4/2018 | Kuan | ............... H04L 43/065 |
| 2006/0250959 A1 * | 11/2006 | Porat | ............... H04L 47/15 370/351 |
| 2018/0287905 A1 * | 10/2018 | Mehta | ............... H04L 43/062 |

FOREIGN PATENT DOCUMENTS

| | | |
|---|---|---|
| KR | 10-2014-0051776 A | 5/2014 |
| KR | 10-1485161 B1 | 1/2015 |

(Continued)

*Primary Examiner* — Kyung H Shin
(74) *Attorney, Agent, or Firm* — NSIP Law

(57) ABSTRACT

Disclosed is a computing apparatus implemented with a network hypervisor implementing software defined network (SDN)-based network virtualization. The computing apparatus include a statistics virtualization module configured to provide individual statistics to each of created virtual networks, a transmission disaggregation module configured to include a physical statistics cache that performs periodic monitoring of a plurality of physical switches and store statistics of the physical switches collected, and a physical statistics aggregation module configured to respond with statistics of the plurality of physical switches when a single monitoring request.

12 Claims, 15 Drawing Sheets

(51) Int. Cl.
*H04L 43/026* (2022.01)
*H04L 41/142* (2022.01)
*H04L 43/00* (2022.01)
*H04L 45/02* (2022.01)
*H04L 47/70* (2022.01)
*H04L 43/065* (2022.01)
*H04L 43/20* (2022.01)
*H04L 45/00* (2022.01)

(56) References Cited

FOREIGN PATENT DOCUMENTS

| | | |
|---|---|---|
| KR | 10-2016-0041631 A | 4/2016 |
| KR | 10-2016-0062688 A | 6/2016 |
| KR | 10-2016-0107920 A | 9/2016 |
| KR | 10-1676570 B1 | 11/2016 |
| KR | 10-2018-0122513 A | 11/2018 |
| KR | 10-2019-0063231 A | 6/2019 |

* cited by examiner (a) Low vStatistics accuracy (tiny pCollector).

(b) Enhanced vStatistics accuracy with starting delay for tiny pCollectors.

(c) Low vStatistics accuracy (aggregated pCollector).

(d) Enhanced vStatistics accuracy with starting delay for aggregated pCollectors.

(a) linear topology (five switches)

(b) fat-tree topology (4-ary)

(a) linear (flow entry).

(b) linear (port).

(c) fat-tree (flow entry).

(d) fat-tree (port).

(a) linear.

(b) fat-tree.

(a) linear (flow entry).

(b) linear (port).

(c) fat-tree (flow entry).

(d) fat-tree (port).

NETWORK MONITORING APPARATUS AND METHOD THEREOF IN PROGRAMMABLE NETWORK VIRTUALIZATION

CROSS-REFERENCE TO RELATED APPLICATIONS

This application claims priority under 35 U.S.C. § 119 to Korean Patent Application No. 10-2020-0051783 filed on Apr. 28, 2020, in the Korean Intellectual Property Office, the disclosures of which are incorporated by reference herein in their entireties.

BACKGROUND

Embodiments of the inventive concept described herein relate to an efficient monitoring method and a system thereof in a programmable software defined network (SDN)-based network virtualization technology, and more particularly, relate to when monitoring in an SDN virtual network controller, a method enabling accurate monitoring in consideration of a virtualized network.

Software defined networking (SDN), which is a networking structure that separates a transmission plane and a control plane of networking equipment and centralizes the control plane to control entire network in a single way, may give flexibility and programmability to network which is dependent on existing manufacturers and difficult to apply new research.

An SDN-based network virtualization technology is a technology that allows multiple network tenants to create and control their own virtual networks, thereby forming an optimized virtual network. When there are multiple tenants and each tenant has its own virtual network, the virtual network may be controlled in the form of SDN through each virtual network controller.

Network hypervisor is a network control element for providing the SDN-based network virtualization technology. The network hypervisor not only monitors and controls the entire physical network, but also abstracts physical network resources such as switches, ports, and links as virtual network resources, thereby providing the virtual network resources to each virtual network controller. Each tenant may control each virtual network provided through the virtual network controller. Through the virtualization technique, there are advantages that a physical network is capable of being distributed to several tenants in an independent form and each virtual network is capable of composing a network specialized for each tenant's service.

Network monitoring is an essential element for management, operation, failover, and optimization of the network. The network monitoring is a task of collecting and observing statistics for each switch, port, and flow. However, in a network virtualization environment in which the multiple tenants create and manage their own networks on a single physical network, the monitoring method has limitations.

In Korean Patent Publication No. 10-2019-0063231, it is disclosed that an SDN-based data center management system includes an SDN controller, a network hypervisor manager, and a resource monitoring module for monitoring network traffic, and a method thereof. However, it is difficult to overcome the limitations of various monitoring methods.

SUMMARY

Embodiments of the inventive concept provide a computing apparatus implemented with a network hypervisor implementing SDN-based network virtualization which provides monitoring results for each virtual network to tenants, performs monitoring tasks with a small delay, and reduces total control channel consumption.

According to an exemplary embodiment, a computing apparatus implemented with a network hypervisor implementing software defined network (SDN)-based network virtualization includes a statistics virtualization module that provides individual statistics to each of multiple virtual networks created and the statistics virtualization module provides virtual flow entry statistics using a first algorithm targeting a virtual flow entry and virtual port statistics using a second algorithm targeting a virtual port.

According to an exemplary embodiment, a computing apparatus implemented with a network hypervisor includes a transmission disaggregation module including a physical statistics cache that performs periodic monitoring of a plurality of physical switches and stores statistics of the physical switches collected and the transmission disaggregation module calculates virtual statistics based on the physical statistics in the physical statistics cache.

According to an exemplary embodiment, a computing apparatus implemented with a network hypervisor includes a physical statistics aggregation module that responds with statistics of a plurality of switches when a single monitoring request and the physical statistics aggregation module performs physical statistics filter (pCollector filter) and physical statistics tuner (pCollector tuner).

According to an exemplary embodiment, a computing apparatus implemented with a network hypervisor according to still another embodiment of the inventive concept includes a statistics virtualization module that provides individual statistics to each of created virtual networks, a transmission disaggregation module that includes a physical statistics cache that performs periodic monitoring of a plurality of physical switches and stores statistics of the physical switches collected, and a physical statistics aggregation module that responds with statistics of the plurality of physical switches when a single monitoring request.

BRIEF DESCRIPTION OF THE FIGURES

The above and other objects and features of the inventive concept will become apparent by describing in detail exemplary embodiments thereof with reference to the accompanying drawings.

DETAILED DESCRIPTION

Figure 1:
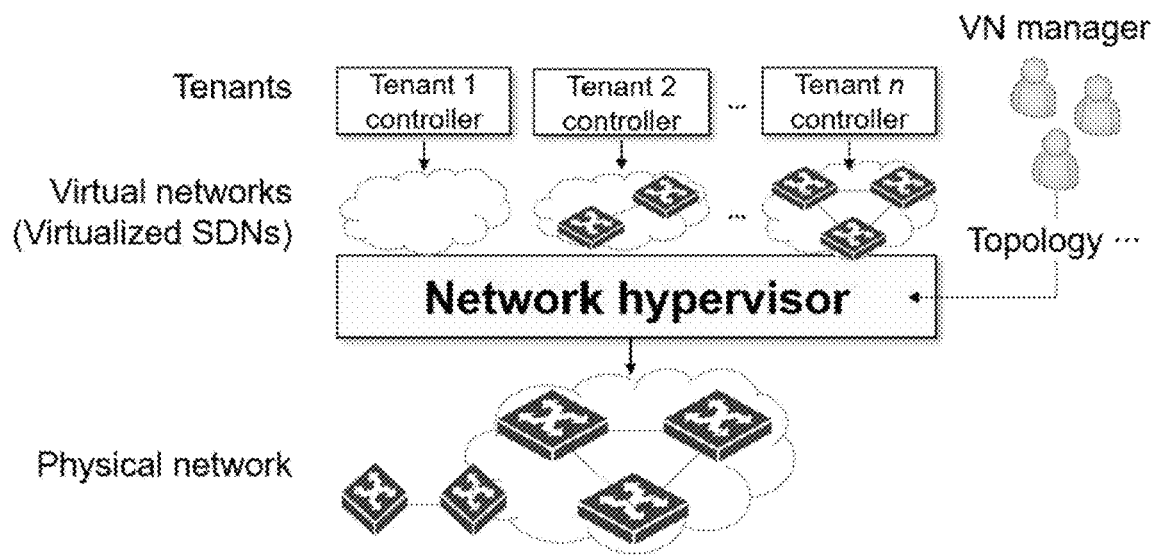
FIG. 1 is a diagram illustrating an SDN-based network virtualization structure according to an embodiment of the inventive concept.

For fully understanding the configuration and effects of the inventive concept, preferred embodiments of the inventive concept will be described with reference to the accompanying drawings. However, the inventive concept is not limited to the embodiments disclosed below but may be implemented in various forms and various modifications may be added.

In addition, terms used in the embodiments of the inventive concept may be interpreted as meaning commonly known to those of ordinary skill in the art, unless otherwise defined.

Hereinafter, with reference to the accompanying drawings, a description will be given of a network hypervisor implementing network virtualization based on a software defined network (SDN) according to embodiments of the inventive concept.

Before describing specific features of the inventive concept, a brief description of terms will be given.

SDN (software defined networking), which is a networking structure that separates a transmission plane and a control plane of networking equipment and centralizes the control plane to control the entire network in a single way, may give flexibility and programmability to network which is dependent on existing manufacturers and difficult to apply new research. The control plane of a centralized switch may be called an SDN controller and may control the transmission plane including network resources such as switches and links.

A network controller is an element used to control each tenant's virtual network. In particular, in the SDN-based virtual network, a tenant's centralized virtual network controller acts as the control plane and performs communication such as sending down rules (or regulations) necessary for data transmission through protocols such as virtual switch and OpenFlow.

Network virtualization is a technology that separates a single physical network into multiple virtual networks and provides the multiple virtual networks. Through network virtualization, it is possible to create a specialized virtual network, thereby increasing the efficiency of services using the network and maximizing the utilization rate of the entire physical network. The network virtualization may be provided using the network hypervisor in the SDN-based network virtualization.

The network hypervisor is an element that provides a separate virtual network to each tenant when there are multiple tenants using different SDN controllers and these tenants use one shared physical network. The network hypervisor plays roles of managing mapping information of virtual network resources and physical network resources and changing control messages such as OpenFlow downed from the virtual network controller into a form suitable for the physical network. The network hypervisor may be implemented as a computing device including at least a processor and/or memory, such as a server. In addition, in this specification, the network hypervisor may be used as a term to mean a computing device in which the hypervisor is implemented.

SDN virtual network monitoring is a task of collecting and observing statistics for each switch, port status, and flow of the network, and is essential for network management and optimization. The SDN network monitoring is performed by collecting statistics such as topology status, flow statistics for each switch, and port status in the physical network and transmitting the statistics to the SDN controller. OpenVirteX, a representative network hypervisor that realizes SDN network virtualization, also performs network monitoring in this way.

However, in a network virtualization environment where multiple tenants create and manage their own networks on one physical network, there is a limit to the monitoring method. Above all, three limitations are specified to be solved.

First, it is impossible to accurately monitor each virtual network. In the network virtualization environment, physical resources are shared among multiple virtual networks. Therefore, the physical network-based monitoring method has a limitation in that statistics cannot be provided for each virtual network. For example, when three tenants create and use virtual networks, respectively, on one physical resource, network monitoring cannot provide information such as network consumption per tenant.

Second, tenants experience high monitoring delays. Network monitoring is performed periodically to manage network conditions. In the network virtualization environment, this periodic monitoring is performed through virtualization every time, thereby increasing the delay from request to response for network monitoring. Due to the high delay, real-time network monitoring is difficult for the tenants and relatively old and inaccurate monitoring results are obtained.

Third, there is a problem of excessive control channel consumption. The control channel is used for statistics collection such as monitoring. In addition, the control channel is utilized in switch connection handshaking, flow entry installation, topology discovery, and ARP processing. When the control channel consumption for monitoring increases, there is a problem that other functions such as flow rule installation experience high delay. Also, because these functions directly affect network performance, the control channel consumption should be kept to a minimum. However, in the network virtualization environment, because multiple tenants perform monitoring and optimization related thereto is not performed, there is a problem that the control channel consumption is increased due to monitoring increases as the number of tenants increases.

Hereinafter, for solving the three problems described above, a network hypervisor that consumes a small number of control channels and delivers network statistics quickly and accurately to tenants will be described.

FIG. 1 is a diagram illustrating an SDN-based network virtualization structure according to an embodiment of the inventive concept.

Referring to FIG. 1, an SDN-based network virtualization structure provides virtual networks to multiple tenants, respectively, and a network hypervisor (or a computing device in which a network hypervisor is implemented) is necessary to virtualize a physical network into a virtual network.

Figure 2:
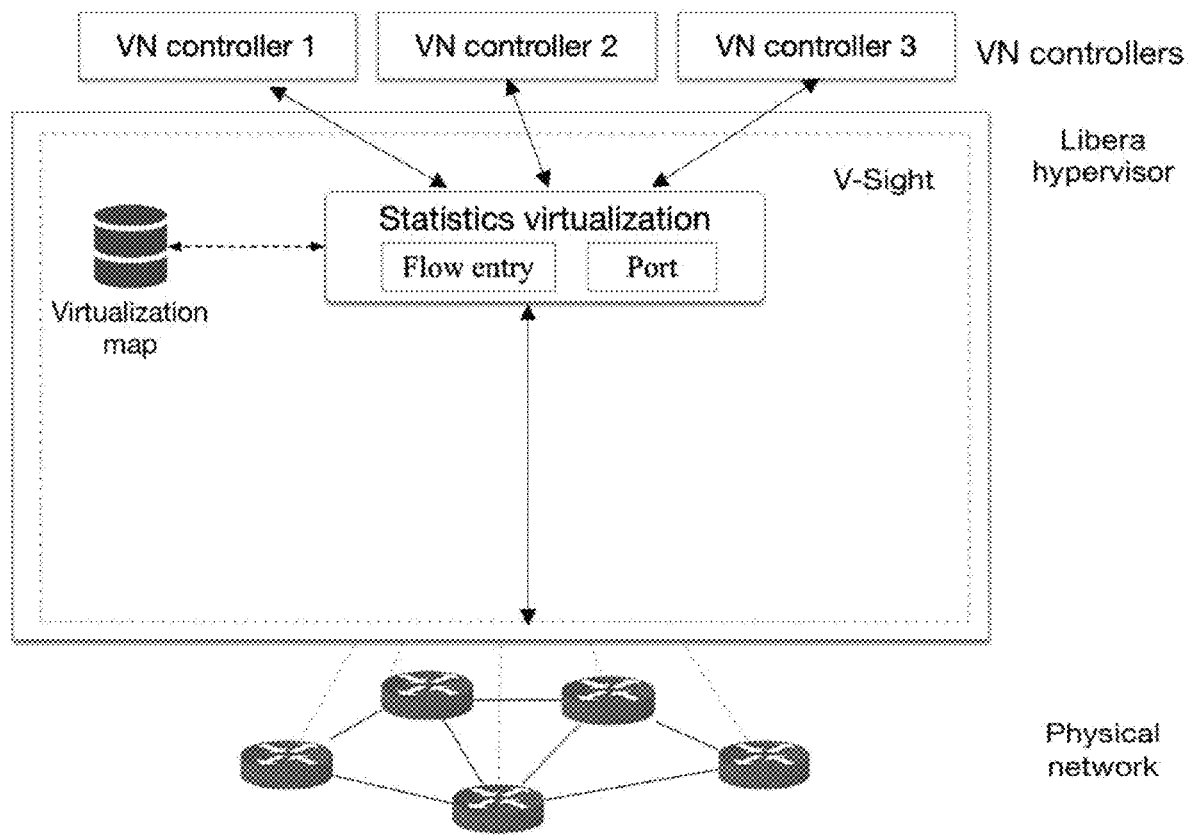
FIG. 2 is a diagram illustrating a network hypervisor according to an embodiment of the inventive concept.

FIG. 2 is a diagram illustrating a network hypervisor according to an embodiment of the inventive concept.

Referring to FIG. 2, a network hypervisor includes a statistics virtualization module that provides individual statistics to a plurality of virtual networks created.

The statistics virtualization module may provide virtual flow entry statistics using a first algorithm targeting virtual flow entry and virtual port statistics using a second algorithm targeting virtual port.

First, the virtual flow entry statistics will be described. The virtual flow entry statistics may include at least one of a packet count, a byte count, and duration of the installed entry. Meanwhile, the network hypervisor may further include a virtual map module for checking mappings between a virtual flow entry (hereinafter, vf) and a physical flow entry (hereinafter, pf), for individual statistics. The first algorithm is as follows.

```
Input: vf: virtual flow entry for which the VN
          controller requires statistics
Output: S(vf): statistics of the vf
pf = V'(vf)
if |V(pf)| == 1 then
|    S(vf) = S(pf)
else
|    if |V(pf)| > 1 then
|    |   E_pf = Find edge pf of vf
|    |_  S(vf) = S(E_pf)
|_
Return S(vf)
```

Referring to the first algorithm, when the pf is not shared with the virtual network (i.e., |V(pj)|=1), the statistics of the pf become the statistics of the vf. When a pf is shared between virtual networks (i.e., |V(pj)|>1), because the pf aggregates all the statistics of the vfs mapped to the pf, the pf statistics do not respond directly to the virtual network controller. In particular, when a plurality of vfs are mapped to one pf, the plurality of vfs for edge switches (the first and/or last switches on a forwarding path) are installed individually per virtual network like the mapping case |V(pj)|=1. This is because, in the edge switches, packets are dealt with separately per virtual network to ensure isolation in the virtual network. That is, because the pf in the edge is allocated per virtual network, the packets at the edge are delivered to a host (or a virtual machine). Accordingly, it is possible to respond to the physical statistics of the edge switch as the requested virtual statistics.

Next, the virtual port statistics will be described. The virtual port statistics may include an amount of received (hereinafter, RX) and/or transmitted (hereinafter, TX) packets. The second algorithm is as follows.

```
Input: vp: virtual port for which the VN controller
          requires statistics
       vs: virtual switch to which the vp belongs
       vf, vf^in, vf^out: virtual flow entry,
       input port of the vf, output port of the vf
Output: S(vp): statistics of the vp
pp = V'(vp)
if |V(pp)| == 1 then
|    S(vp) = S(pp)
else
|    for vf_i belongs to vs do
|    |   if vf_i^in == vp then
|    |   |   S(vp).RX + = S(vf_i):
|    |   else if vf_i^out == vp then
|    |_  |   S(vp).TX + = S(vf_i)
|_
Return S(vp)
```

Referring to the second algorithm, similar to the flow entry, a physical port (hereinafter, pp) may be shared by one or more virtual networks. When a single virtual network utilized the physical port, the statistics of the pp become statistics of the virtual port (hereinafter, vp). Meanwhile, when the pp is mapped to a plurality of vps, traffic of a plurality of virtual networks is received and transmitted. In this case, the virtual flow statistics obtained in Algorithm 1 are used because the vfs process the packets transmitted to and received from the vp of a switch. For RX, virtual statistics of the vfs that have vp as its input port are accumulated. To calculate the TX, the virtual statistics of the vf sending packets out to the vp are added.

Figure 3:
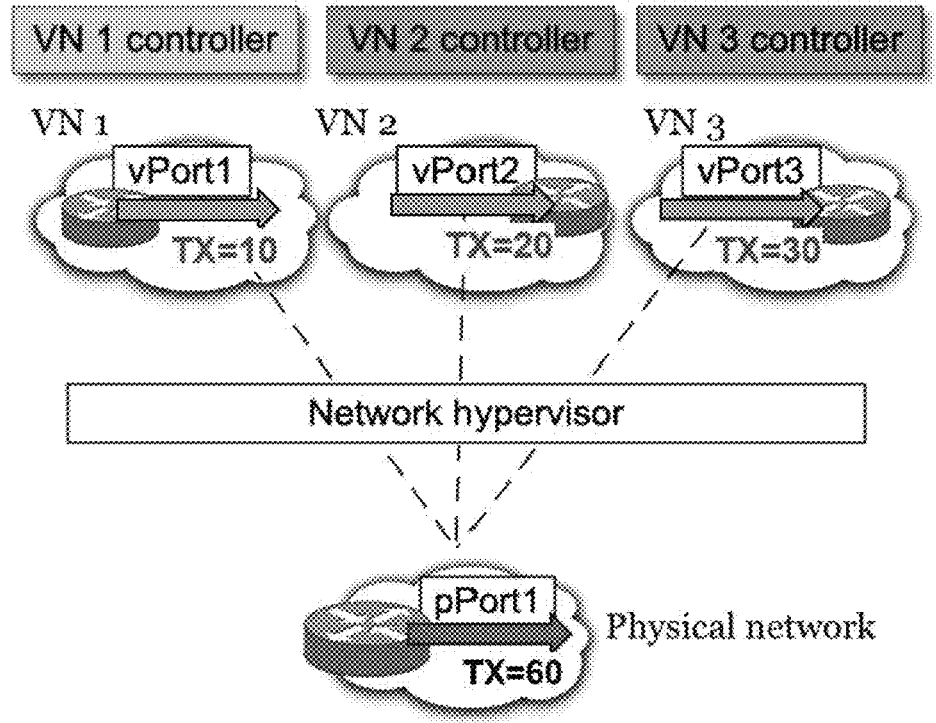
FIG. 3 is a diagram illustrating an example of providing individual statistics to a virtual network when a network hypervisor according to an embodiment of the inventive concept is used.

Thus, when the statistical virtualization module is used, it is possible to provide isolated statistics to the plurality of virtual networks, respectively. FIG. 3 is a diagram illustrating an example of providing individual statistics to a virtual network when a network hypervisor according to an embodiment of the inventive concept is used. Referring to FIG. 3, when traffic statistics of a physical port is 60, all virtual networks obtain statistics of 60 as a monitoring result in the conventional case. However, when the statistical virtualization module according to an embodiment of the inventive concept is used, each virtual network may isolatedly obtain its own statistics, for example, a first virtual network may obtain statistics of 10, a second virtual network may obtain statistics of 20, and a third virtual network statistics may obtain statistics of 30, respectively.

The second problem of the aforementioned problems, that is, delay in monitoring, will be described in detail.

Figure 4:
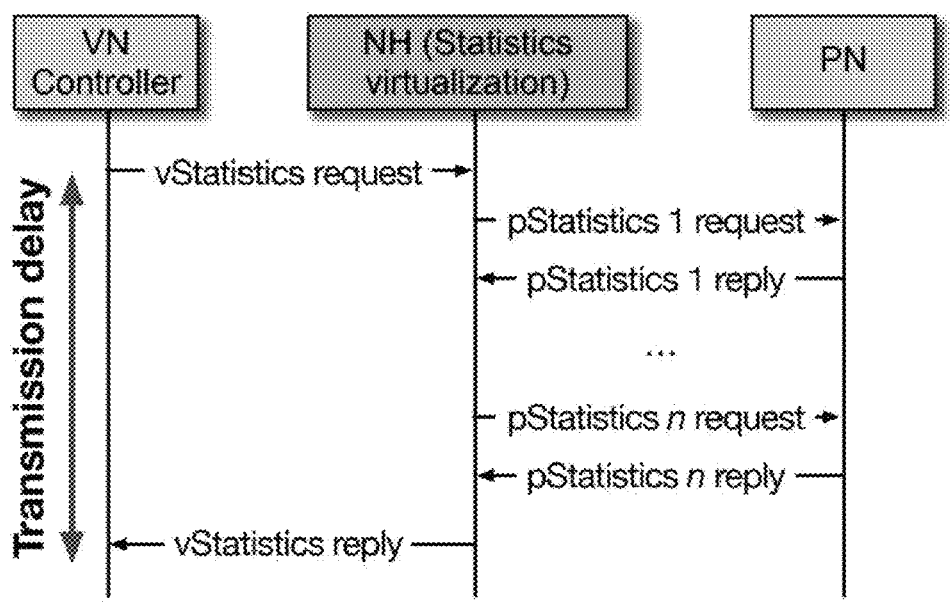
FIG. 4 is a diagram illustrating a general SDN-based network virtualization structure.

FIG. 4 is a diagram illustrating a general SDN-based network virtualization structure.

Referring to FIG. 4, a transmission delay of virtual statistics include (1) a virtual statistics request and a reply message transmission time (hereinafter, $d_v$) between a virtual network controller and a network hypervisor, (2) physical statistics request and a reply message transmission time (hereinafter, $nd_p$) between the virtual network controller and a physical switch (which may occur multiple times depending on the request of virtual statistics), and (3) processing time (hereinafter, $d_{NH}$) in the network hypervisor for statistical calculation. When the number of physical statistics required for virtual statistics is "n," the total transmission delay is formulated as $d_v+nd_p+d_{NH}$. To reduce the delay, the physical statistics transmission time, $nd_p$, should be reduced. Accordingly, to reduce $nd_p$, a physical statistics cache and request interval estimation are introduced using a transmission disaggregation module.

Figure 5:
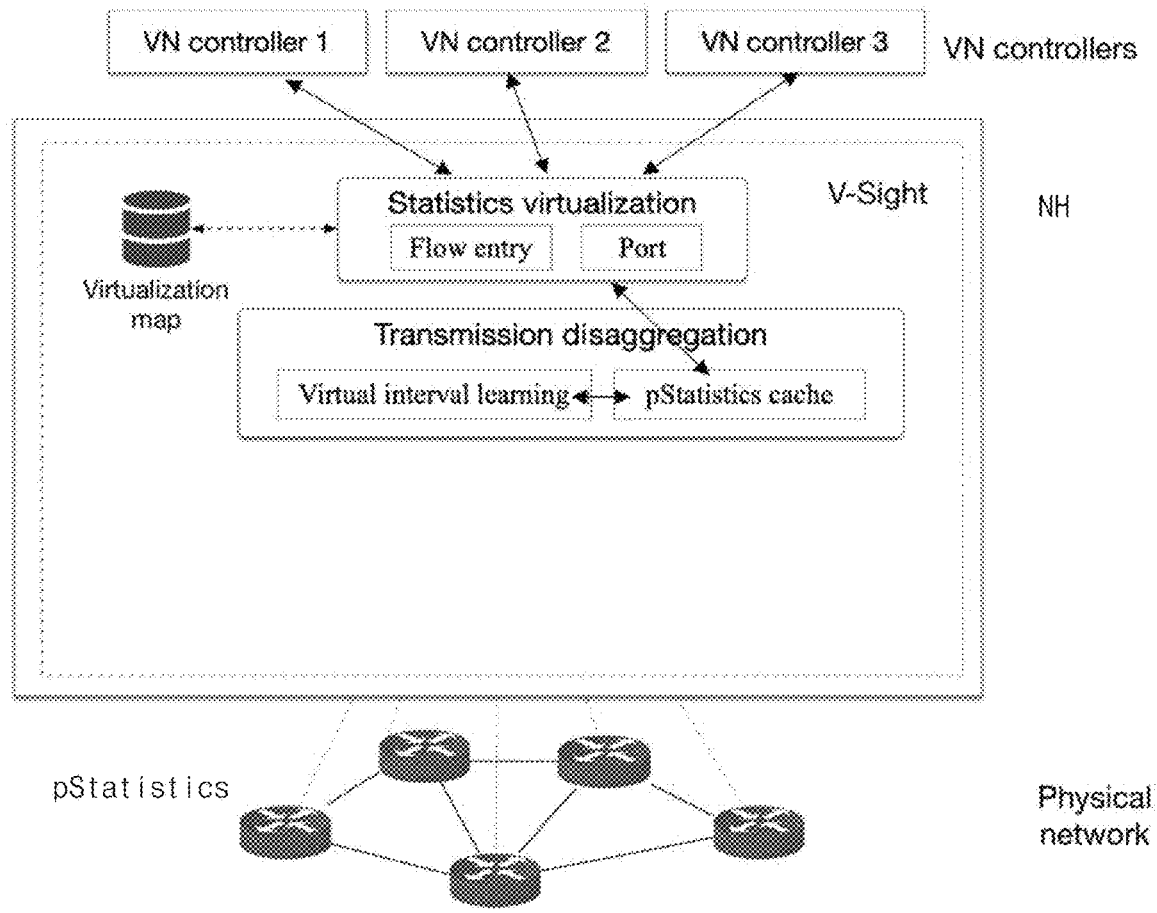
FIG. 5 is a diagram illustrating an SDN-based network virtualization structure according to an embodiment of the inventive concept.

FIG. 5 is a diagram illustrating an SDN-based network virtualization structure according to an embodiment of the inventive concept.

Referring to FIG. 5, a network hypervisor may include a transmission disaggregation module. In this case, the network hypervisor may further include a statistical virtualization module shown in FIG. 1. The statistical virtualization module is the same as that described in FIGS. 1 to 3, and a detailed description thereof will be omitted.

Hereinafter, the transmission disaggregation module will be described in detail. As described above, the transmission disaggregation module introduces a physical statistics cache and request interval estimation.

Figure 6:
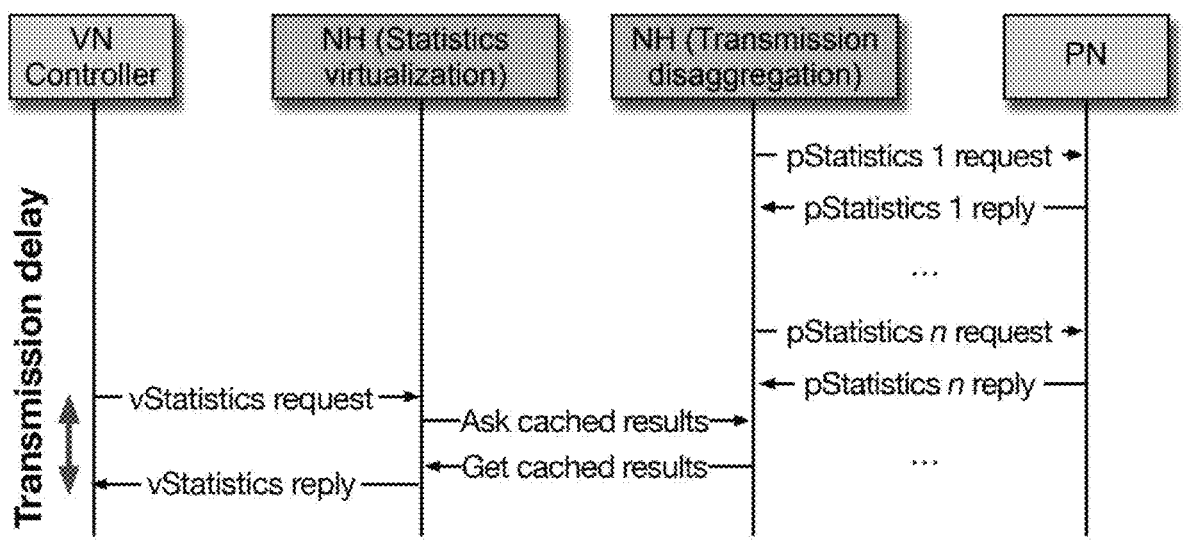
FIG. 6 is a diagram illustrating a transmission delay when a transmission disaggregation module according to an embodiment of the inventive concept is used.

First, the physical statistics cache tracks the time the physical statistics are stored and whether the physical statistics per virtual network have already been used. When the physical statistics cache contains physical statistics that are not used in the requested virtual network (hit), the physical statistics may be directly responded to without retrieving the physical statistics from the physical switch. On the other hand, when the physical statistics are not in the physical statistics cache (miss) or are out of date (old) because they were previously used in virtual network requests, the cache retrieves the physical statistics from the physical switch. FIG. 6 is a diagram illustrating a transmission delay when a transmission disaggregation module according to an embodiment of the inventive concept is used. Referring to FIG. 6, when the number of physical statistics required for virtual statistics is "n" and "k" of the physical statistics is in the cache (hit, that is, n−k accesses to the physical statistics cache are miss or old), the physical transmission n−k times are conducted for virtual statistics. Then, the entire transmission delay may be reduced to $(1+n-k) \, dp + d_{NH}$. Therefore, increasing the number "k" is important to improve the transmission delay.

The physical statistics cache may be filled with collected physical statistics (hereinafter, pCollector). The pCollector exists for each pf. That is, the pCollector is executed to retrieve the physical statistics on the pf of the physical switch. To be clear, the term "interval" is used for the time between two consecutive requests from a virtual network controller for a pf, and "period" is used for the time difference between two consecutive executions of the pCollector.

For each pCollector, the period execution should be determined. When the period of the pCollector is much shorter than the request interval, the pCollector will end up executing multiple times before the hit, which wastes the CPU and control channel resources. Conversely, when the pCollector is executed less frequently than the virtual statistics requests, the transmission delay may not be reduced because the physical statistics are old. Therefore, determining the execution period is very important, and this is what request interval estimation does.

The request interval estimate calculates the mean (u) and variance (a) per pf that characterize the request intervals of the virtual network controller. For $pf_i$, the request of $VN_j$ is denoted as $pf_{i,j}$ and its distribution is $(\mu_{i,j}, \sigma_{i,j})$. The physical statistics cache includes a pf identifier ($pf_i$) and a VN identifier (j). The kth interval for $pf_{i,j}$ s denoted as $pf_{i,k}^{k}$.

Figure 7:
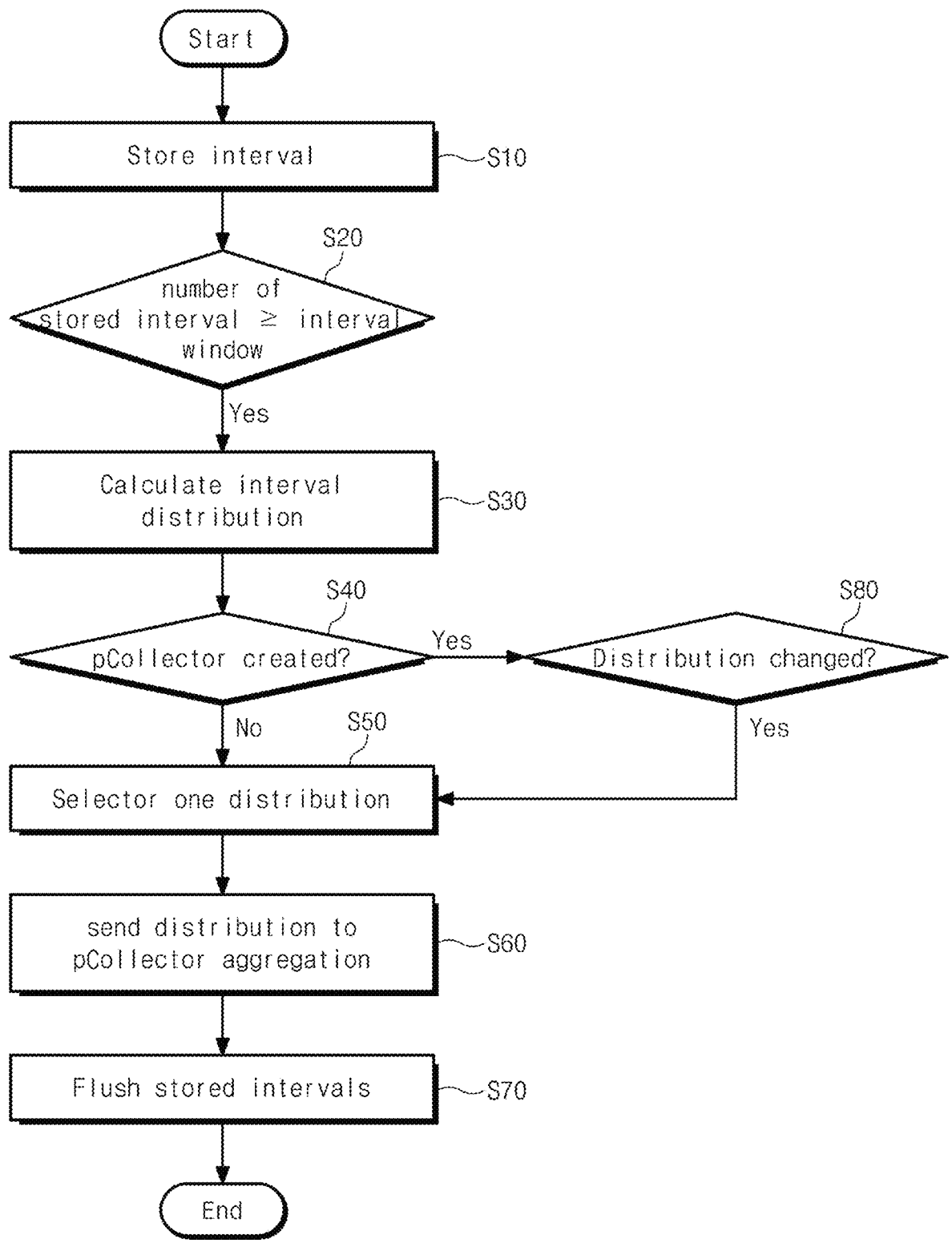
FIG. 7 is a flowchart illustrating request interval estimation according to an embodiment of the inventive concept.

FIG. 7 is a flowchart illustrating request interval estimation according to an embodiment of the inventive concept. Referring to FIG. 7, the request interval estimation is performed every time a physical flow identifier $pf_i$ and a virtual network identifier j are received. This process is executed whenever a physical flow identifier ($pf_i$) and the virtual network identifier (j) are received as per each virtual statistics request. First, the request interval estimation records the interval between consecutive requests in S10. When sufficient intervals are accumulated in S20, the request interval estimation is calculated ($\mu_{i,j}, \sigma_{i,j}$) in S30. The number of intervals used for the calculation may be denoted as 'interval window (ω)'. The experiments for changing the w value are not included. However, for the default monitoring operation of ONOS, 30 is enough to obtain a stable and reliable interval distribution. When the (ω>+1)th request comes, the distribution of $pf_{i,j}$ ($\mu_{i,j}, \sigma_{i,j}$) is calculated based on $pf_{i,j}^{1}$ to $pf_{i,j}^{w}$. Subsequently, an interval distribution having a minimum u value is selected from among distributions of several virtual networks in S50. In other words, where $(\mu_i, \sigma_i) = ((\mu_{i,l}, \sigma_{i,l})$, where $l = \arg\min_j \mu_{i,j}$. The requests having greater μ than selected $pf_i$ will be hit because the pCollector for pf based on $(\mu_i, \sigma_i)$ stores the statistics of $pf_i$ for those requests in a timely way. The selected distribution may be passed to the pCollector module as a triple ($pf_i, \mu_i, \sigma_i$). The pCollector is created after the w number of intervals is accumulated. Before the interval window, the physical statistics cache generates 'miss' for the required physical statistics of $pf_i$, which collects the physical statistics from the physical network for each request.

The request interval of each virtual network controller may be changed. The request estimation interval flushes the w number of the past intervals ($pf_{i,j}^{1}$ to $pf_{i,k}^{w}$) after sending a new interval distribution in S70, and accumulates the interval 1 to w again. Thus, for the w number of recorded intervals in S20, ($\mu_{i,j}, \sigma_{i,j}$) is updated in S30. When the pCollector for $pf_i$ is already generated in S40, the request interval estimation checks how much the newly updated $\mu_{i,j}$ is changed from the previous value in S80. When the changed amount is large (e.g., 25%), the function selects a new distribution for $pf_i$ in S50 and delivers a new triple ($pf_i, \mu_i, \sigma_i$) to the pCollector aggregation in S60.

Figure 8:
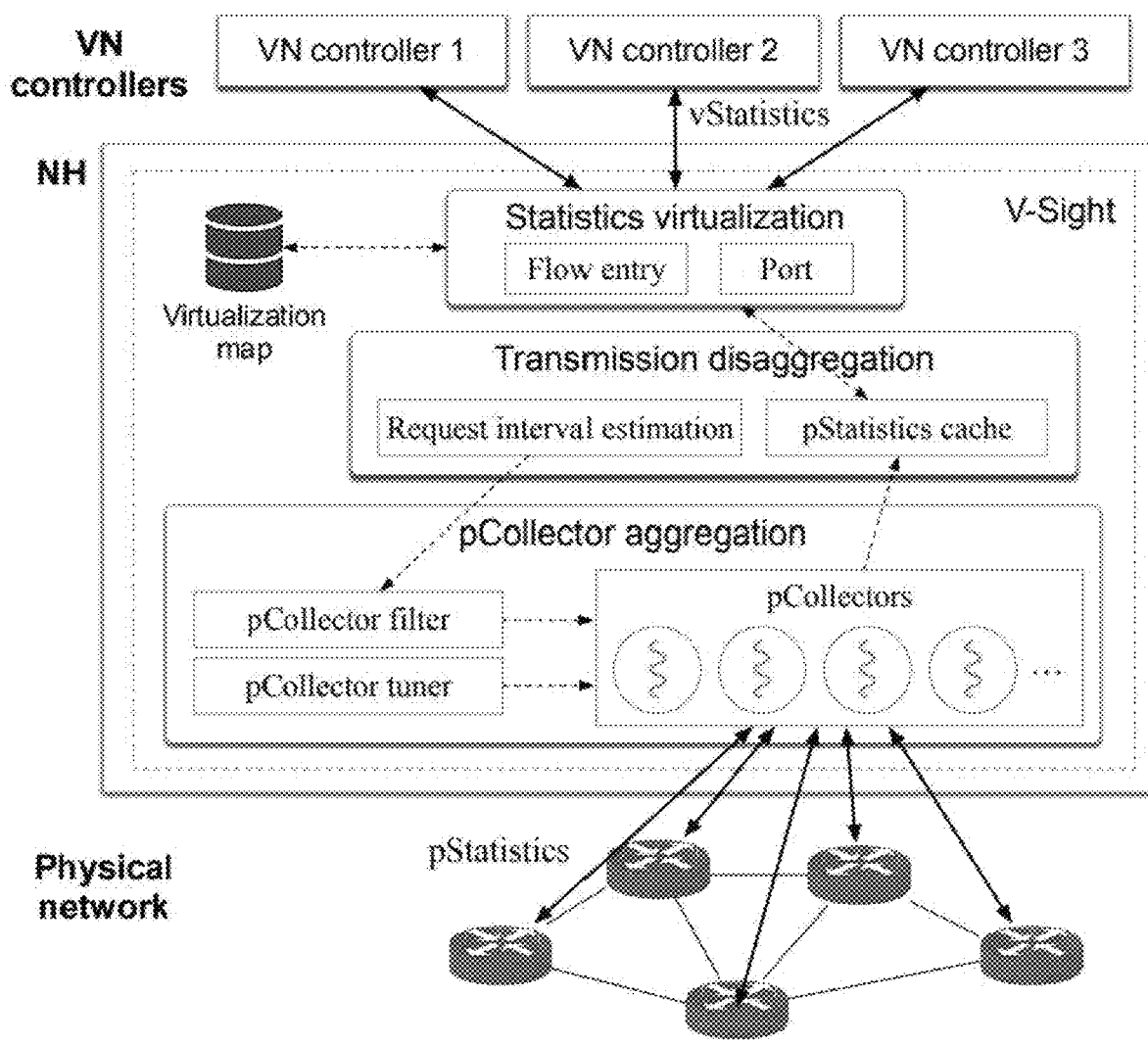
FIG. 8 is a diagram illustrating a network hypervisor according to an embodiment of the inventive concept.

FIG. 8 is a diagram illustrating a network hypervisor according to an embodiment of the inventive concept.

Referring to FIG. 8, the network hypervisor may further include a collected physical statistics (pCollector) aggregation. In this case, the network hypervisor may further include a statistical virtualization module shown in FIG. 1 and a transmission disaggregation module shown in FIG. 5. The statistical virtualization module is the same as that described in FIGS. 1 to 3, and the transmission disaggregation module is the same as that described in FIGS. 5 to 7, and a detailed description thereof will be omitted.

The pCollector aggregation module may perform 'pCollector filter' and 'pCollector tuner'.

The pCollector filter determines an execution cycle of each pCollector and checks whether the pCollector may be merged into one pCollector for a specific physical switch. The pCollector tuner determines the starting delay of pCollector for accuracy improvement.

Figure 9:
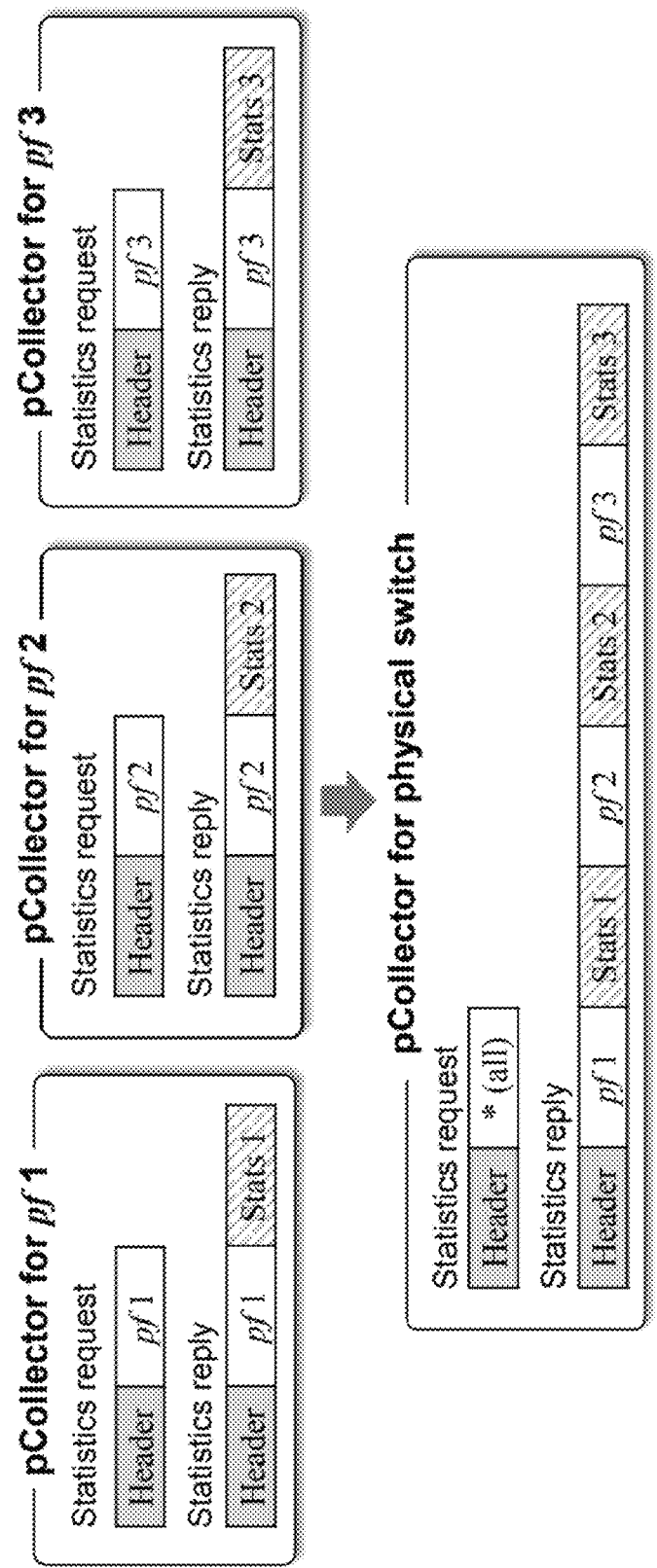
FIG. 9 is a diagram illustrating two types of physical statistics (pCollector)

The objective of pCollector aggregation is to execute and merge pCollectors. Given a triple ($pf_i, \mu_i, \sigma_i$) in the transmission disaggregation module, a pCollector for $pf_i$ is generated. The pCollector periodically retrieves the $pf_i$ statistics from a switch. However, as the number of pCollectors increases, the pCollector may consume too much of the control channel. FIG. 9 is a diagram explaining two types of physical statistics (pCollector). At the top of FIG. 9, three pCollector retrieves statistics from their own pf. At the bottom of FIG. 9, one pCollector collecting multiple statistics at once is shown. For the former, the request message should contain match fields and actions of pf. Conversely, for the latter, the request message includes "all" as its request. Obviously, the latter pCollector consumes less amount of control channels than the former. The former pCollector for a single pf will be referred to as 'tiny pCollector' and the latter pCollector will be referred to as 'aggregated pCollector'. An aggregated pCollector is created when many tiny pCollectors follow similar period for pf in a switch.

The pCollector aggregation is done by two tasks, that is, pCollector filter to determine the execution period of tiny and aggregated pCollector and pCollector tuner for improving accuracy of virtual statistics using results of the pCollector.

From ($pf_i$, $\mu_i$, $\sigma_i$), the pCollector filter determines a period of the pCollector for $pf_i$. For tiny pCollector, this is simple. However, for the aggregated pCollector, when the virtual network controllers issue statistics requests at similar intervals, each $\mu_i$ of $pf_i$ may be slightly different (e.g., 4.7 seconds, 4.9 seconds, and 5.1 seconds) because the distribution is estimated based on w samples. Therefore, it is challenging to determine the period of aggregated pCollector. To solve this problem, the pCollector filter starts with tiny pCollectors to have a similar period.

Figure 10:
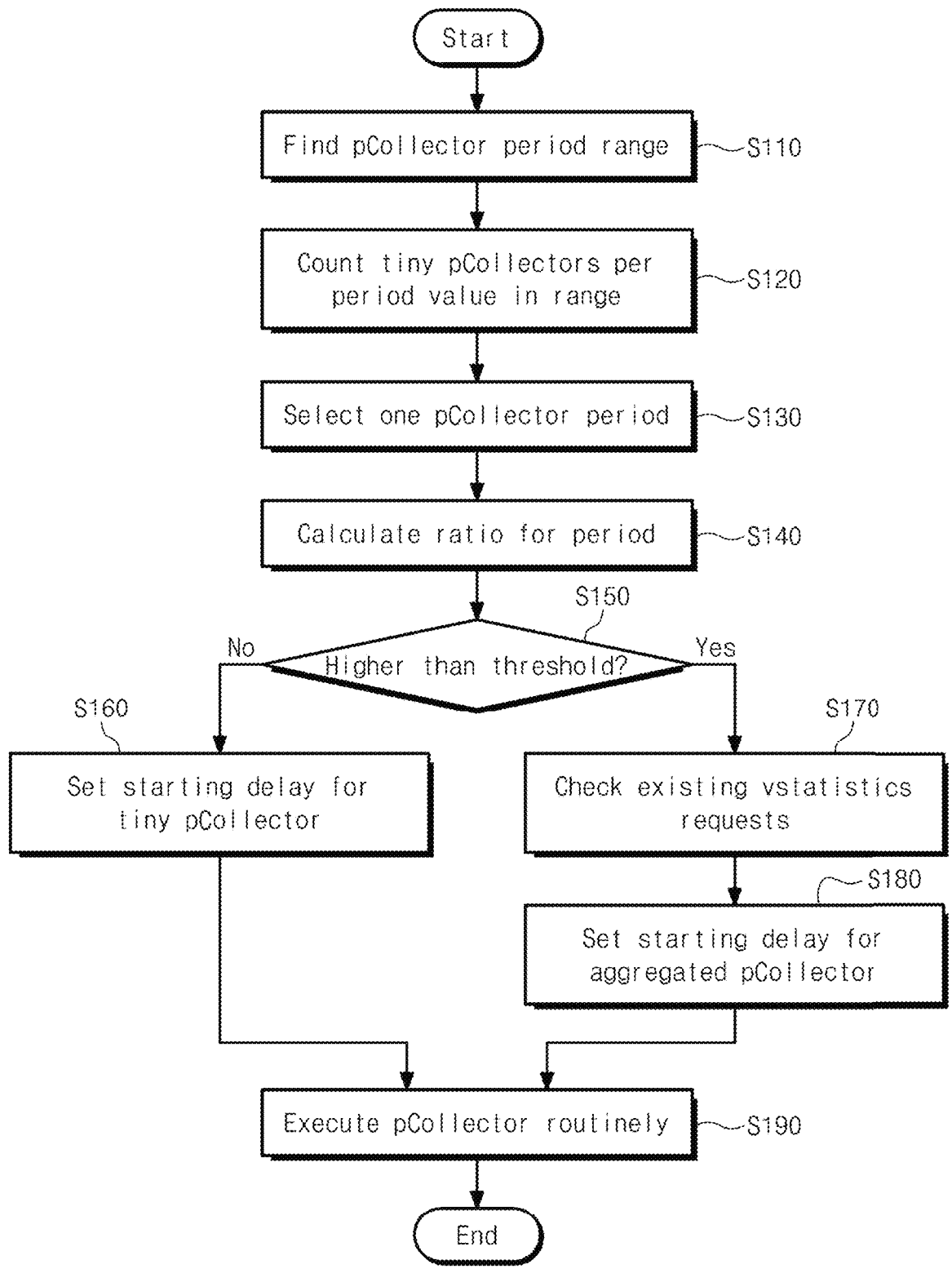
FIG. 10 is a flowchart illustrating a physical statistics aggregation module.

FIG. 10 is a flowchart illustrating a physical statistics aggregation module. Referring to FIG. 10, from the cumulative probability distribution function derived by $\mu_i$ and $\sigma_i$, the pCollector filter finds a period range satisfying a certain hit rate, such as 90% to 95% in S110. The requests that have longer intervals than the period of the pCollector will be hits, and thus this task may stochastically derive the periodic range using $\mu_i$ and $\sigma_i$. Thereafter, for every possible period value within the range, the pCollector filter counts the number of tiny pCollector with the period for the value in S120, and the period value with the largest number of tiny pCollectors is selected in S130. Once a period is selected, the pCollector filter calculates the ratio of the number of tiny pCollector following a similar period to the number of existing pfs in the switch in S140. When the ratio is low, an aggregated pCollector consumes more control traffic than the tiny pCollector. Therefore, when the ratio is high (e.g., 70%) in S150, the pCollector tuner merges existing tiny pCollectors into the aggregated pCollector.

The role of the pCollector tuner is to give additional delay to the first execution of each pCollector to improve the accuracy of the virtual statistics. FIGS. 11A to 11D are diagrams illustrating a starting delay of an aggregated pCollector and a tiny pCollector according to an embodiment of the inventive concept. In FIGS. 11A to 11D, a red box represents a virtual statistics request from a virtual network, a blue box represents a pStatistics response by a tiny pCollector, a purple box represents pStatistics by an aggregated pCollector, and a red arrow represents a time difference between the virtual statistics request and the physical statistics response.

Figure 11A:
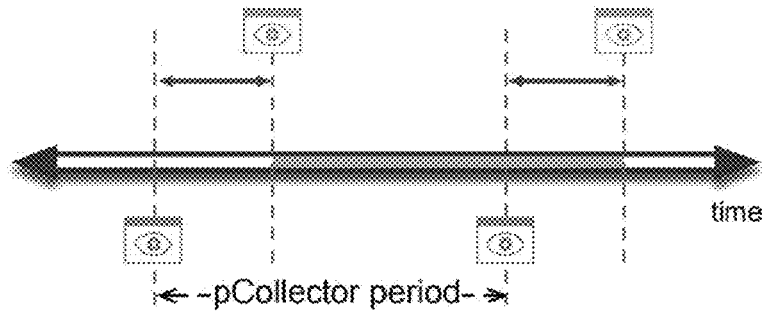
FIGS. 11A to 11D are diagrams illustrating a starting delay of an aggregated pCollector and a tiny pCollector according to an embodiment of the inventive concept.
Figure 11B:
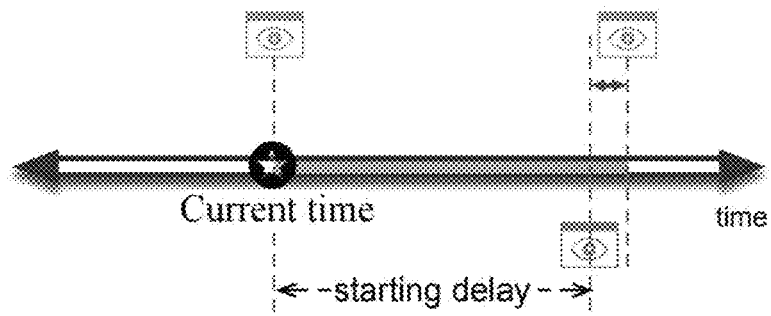

Referring to FIG. 11A, there is a time difference between a time when a virtual statistics request arrives and a time when pStatistics are gathered through pCollector. This time difference depends on the time when the pCollector first runs. When the pCollector is executed slightly before the virtual statistics request, the time difference is small as shown in FIG. 11B, which means that the cached pStatistics are up-to-date. As the time difference becomes bigger, it hurts the accuracy of the virtual statistics. Therefore, 'starting delay' is introduced to add a delay to the first execution of pCollectors. For tiny pCollectors, the starting delay should be set to execute the tiny pCollector immediately before the virtual statistics requests (coming after interval window). Also, as shown in FIG. 11A, the starting delay should not be too large to avoid pCollector to be executed after the virtual statistics request. The starting delay is set to 95% of the pCollector period in S160 in FIG. 10.

Figure 11C:
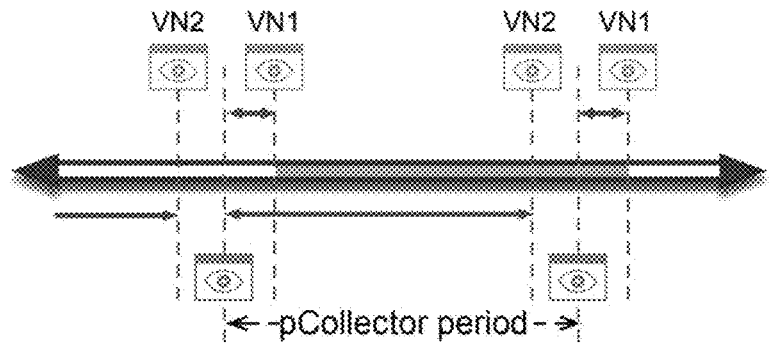

On the other hand, for aggregated pCollectors, the way of seeing the starting delay for tiny pCollectors rather leads to poor accuracy. This is because the multiple requests handled by the aggregated pCollector exist at different times in terms of the pCollector period. FIG. 11C illustrates an example with two virtual statistics requests from different virtual networks (VN2 followed by VN1). When the starting delay is set to 95% of the aggregated pCollector, the execution time of the aggregated pCollector may be after VN2 and before VN1. As FIG. 11C shows, VN2 suffers a long delay because the aggregated pCollector executes immediately after the request of VN2.

Figure 11D:
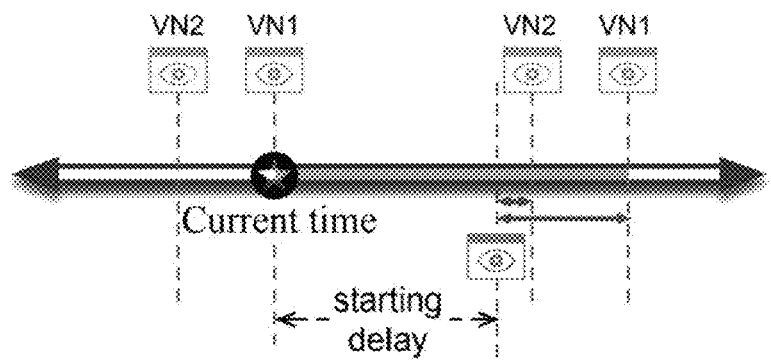

Therefore, the pCollector tuner sets the starting delay of the aggregated pCollector as follows. First, the pCollector tuner checks the request interval estimation which stores the virtual statistics request times for each virtual network in S170 in FIG. 10. Referring to FIG. 11D, the starting delay is set to be immediately before the first virtual statistics request among virtual network requests that are merged by the aggregated pCollector in S180 of FIG. 10. In this way, the sum of the time differences from the time the aggregated pCollector is executed to the time each virtual statistics request arrives is minimized. Finally, the pCollector tuner periodically executes pCollector with the starting delay in S190 of FIG. 10.

Hereinafter, an experimental example of an SDN network including a network hypervisor according to an embodiment of the inventive concept will be described.

In the experimental example, transmission delay, control channel consumption, and accuracy overhead are measured, and each experiment is repeated for more than 40 measured results.

Experimental Example 1 is a virtualized SDN including the network hypervisor described in this embodiment, Comparative Example 1 is a virtualized SDN using a network hypervisor without the characteristics of the network hypervisor described in this embodiment, and Example 2 is a non-virtualized native network.

Figure 12A:
FIG. 12A is a diagram illustrating a linear topology and FIG. 12B is a diagram illustrating a 4-ary fat-tree topology.
Figure 12B:
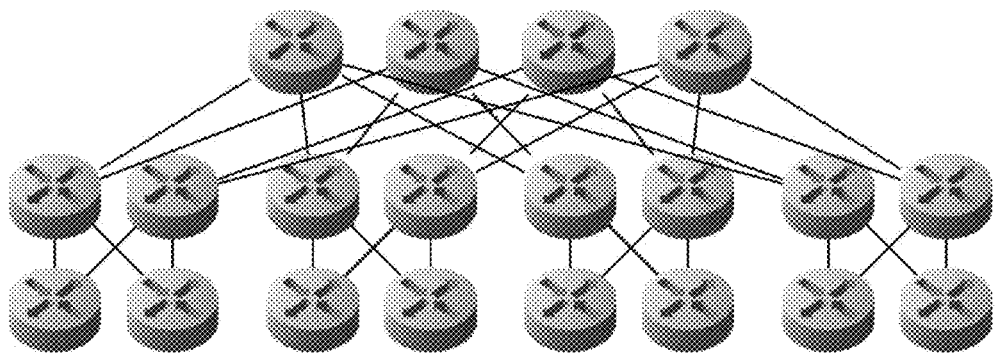

FIG. 12A is a diagram illustrating a linear topology and FIG. 12B is a diagram illustrating a 4-ary fat-tree topology. Each of Experimental Example 1, Comparative Example 1, and Comparative Example 2 were performed according to the topology shown in FIGS. 12A and 12B.

In addition, the number of TCP connections generated by iperf3 for each of Experimental Example 1, Comparative Example 1, and Comparative Example 2 was changed, and each tenant issues a monitoring request to the ONOS controller.

Evaluation

1. Transmission delay: Average interval between the virtual statistics request and reply message from/to virtual network controllers is measured and evaluated.

FIGS. 13A to 13D are graphs showing average statistical transmission delays for each of Experimental Example 1, Comparative Example 1, and Comparative Example 2.

In FIGS. 13A to 13D, it is shown that transmission delay of Comparative Example 1 increases significantly in proportion to the number of TCP connections (more than 2 seconds). However, in Experimental Example 1, the pStatistics transmission routines were disaggregated from vStatistics virtualization, thereby reducing this delay. In linear topology of FIGS. 13A and 13B, Experimental Example 1 consumes 9.35 ms and 4.68 ms, on average, for flow input and port statistics transmission, respectively. The delays of Experimental Example 1 improved 46 times (flow entry statistics, 6 connections) to 454 times (port statistics, 30 connections) compared to those in Comparative Example 1.

Figure 13A:
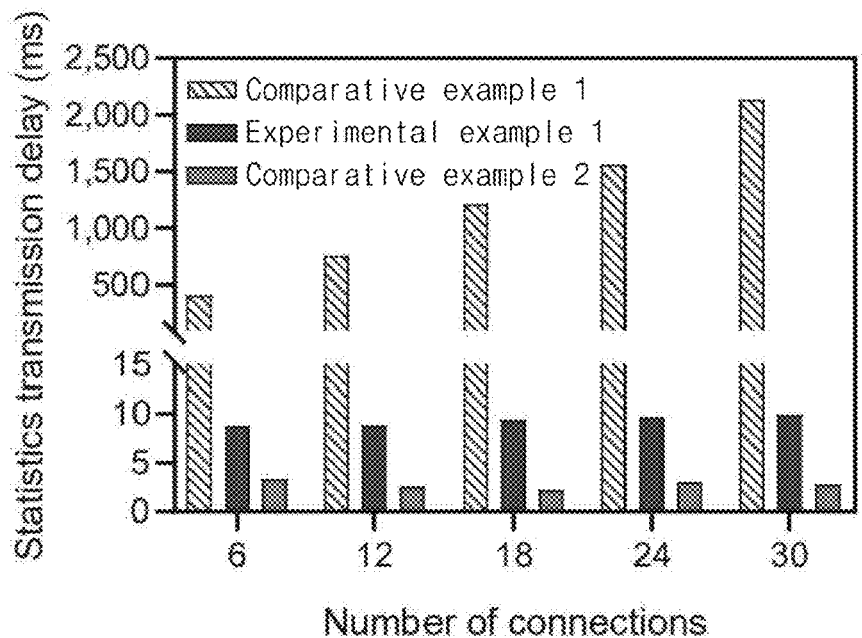
FIGS. 13A to 13D are graphs showing average statistical transmission delays for each of Experimental Example 1, Comparative Example 1, and Comparative Example 2.
Figure 13B:
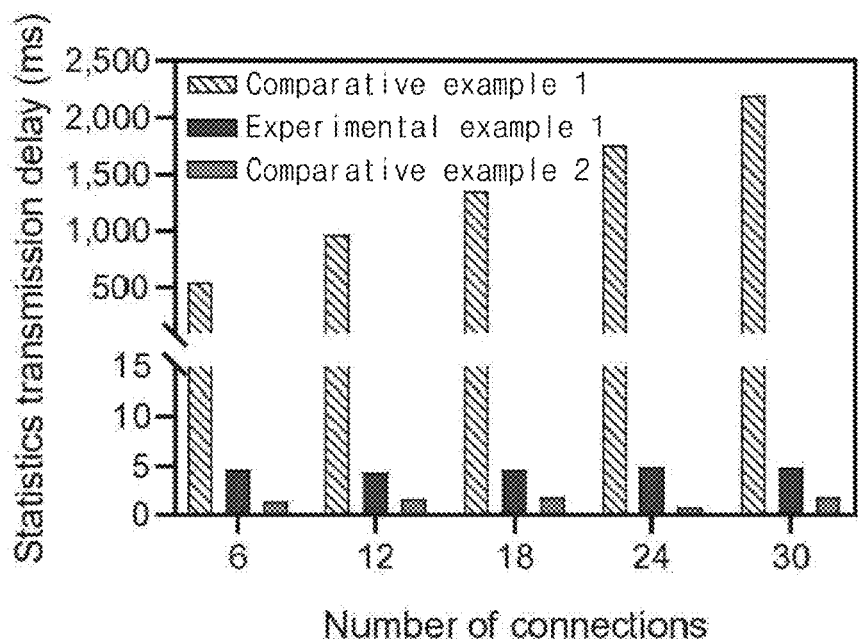
Figure 13C:
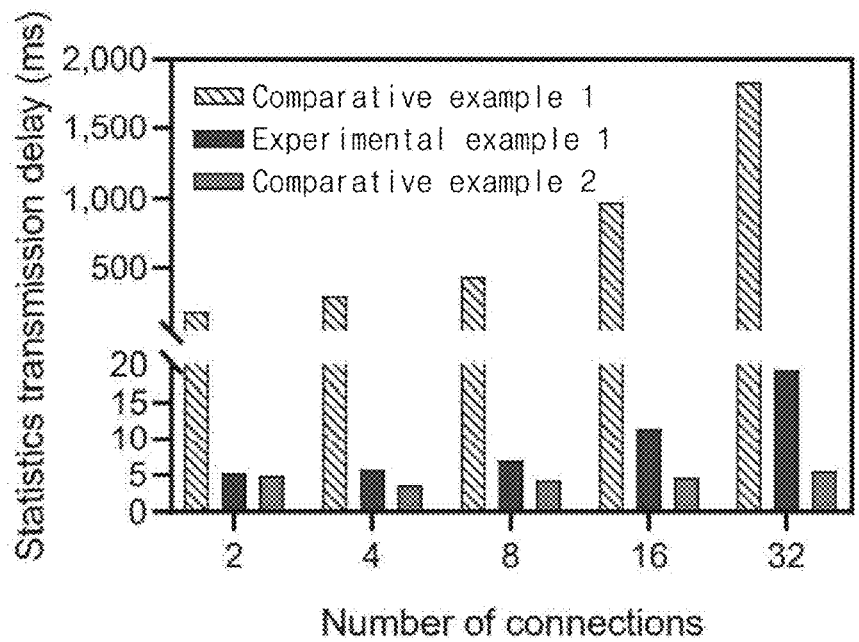
Figure 13D:
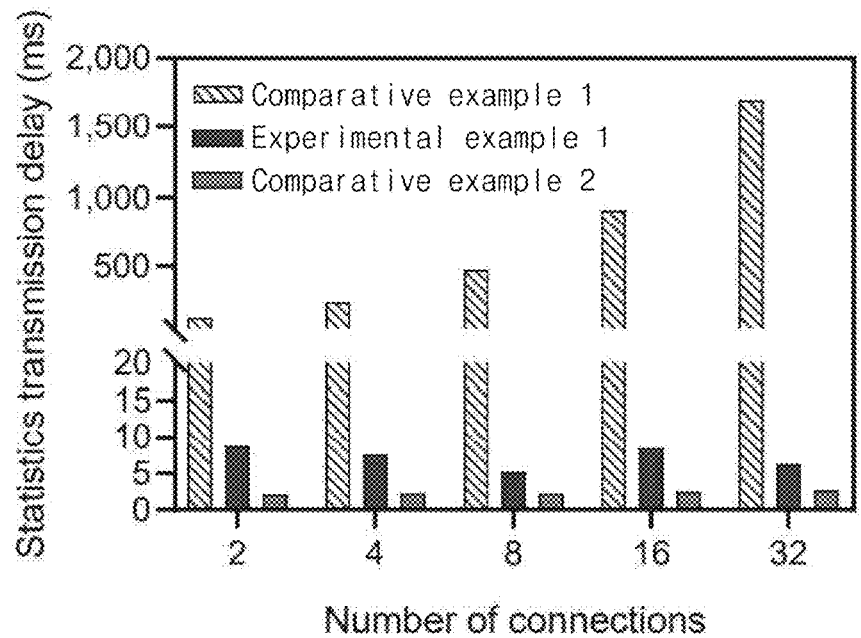

For fat-tree topology of FIGS. 13C and 13D, Experimental Example 1 takes 9.75 ms and 7.29 ms of transmission delay for the flow rate input and the port, respectively. The delay in Experimental Example 1 improved 14 times (port statistics, 2 connections) to 269 times (port statistics, 32 connections). In detail, the transmission delay in the virtual network increases in proportion to the number of TCP connections, because the number of pStatistics required for vStatistics increases as the connection numbers increases. Then, vStatistics are returned to the virtual network controller only after the corresponding pStatistics are collected. In contrast, Experimental Example 1 may disaggregate pStatistics transmission routines from vStatistics virtualization, thereby reducing this delay.

By comparing the transmission delay between Experimental Example 1 and Comparative Example 2, it is possible to check the virtualization overhead. In linear topology of FIGS. 13A and 13B, Comparative Example 2 takes 2.8 ms and 1.5 ms for flow input and port statistics transmission delay, respectively. The delays of Experimental Example 1 are 3.4 times higher, on average, than those of Comparative Example 2. For the fat tree topology of FIGS. 13C and 13D, Comparative Example 2 shows 4.6 ms and 2.37 ms delays for flow input and port statistics transmission, respectively. The results of Experimental Example 1 were 1.09 times (flow entry statistics, 2 connections) to 6.69 times (port statistics, 2 connections) higher than Comparative Example 2. Although the delays of Experimental Example 1 were higher than those of Comparative Example 2, all values were lower than 20 ms. The default monitoring intervals of ONOS, Floodlight, and OpenDayLight are 5 seconds, 10 seconds, and 15 seconds, respectively, and thus the transmission delay of Experimental Example 1 (which is 19.36 ms at maximum) may be accepted.

2. Control Channel Consumption: Average values of bytes per second of control channel traffic to get flow entry (pf) statistics between the network hypervisor and the physical switches are measured and evaluated.

Figure 14A:
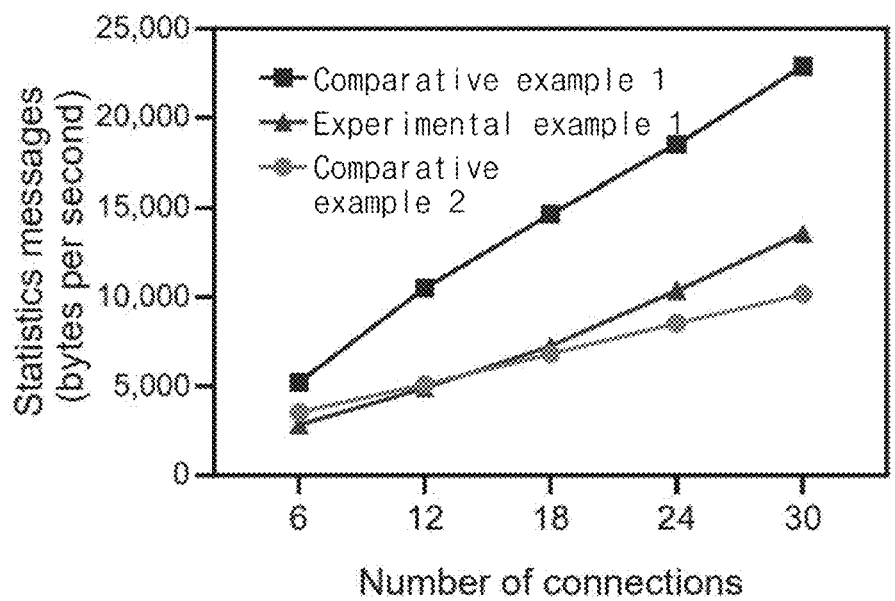
FIGS. 14A and 14B are graphs showing control channel consumption in Experimental Example 1, Comparative Example 1, and Comparative Example 2 in two topologies.
Figure 14B:
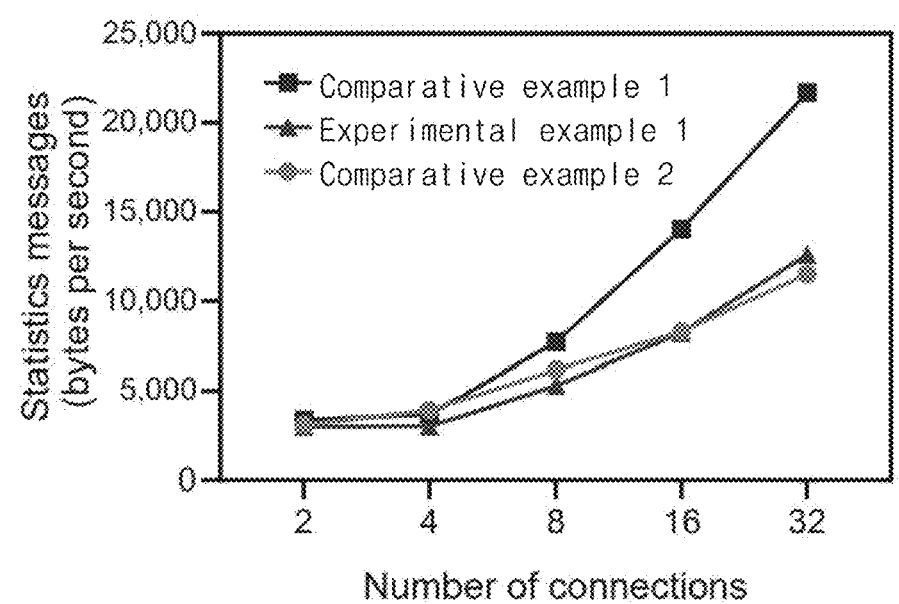
Figure 15A:
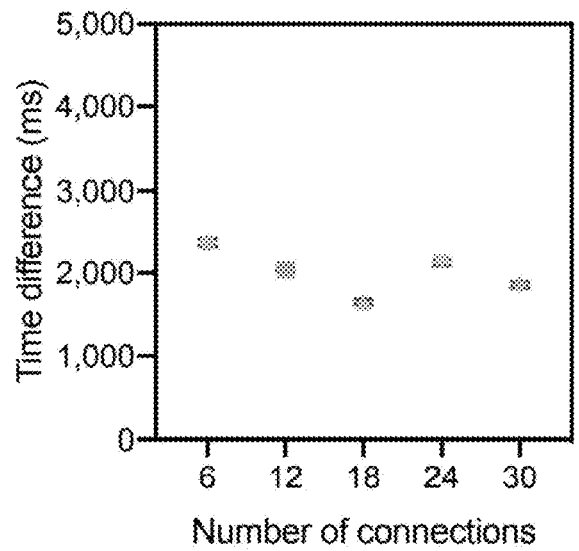
FIGS. 15A to 15D are graphs showing time differences for the number of network connections in linear and fat-tree topology, plotted average and 95% confidence interval.
Figure 15B:
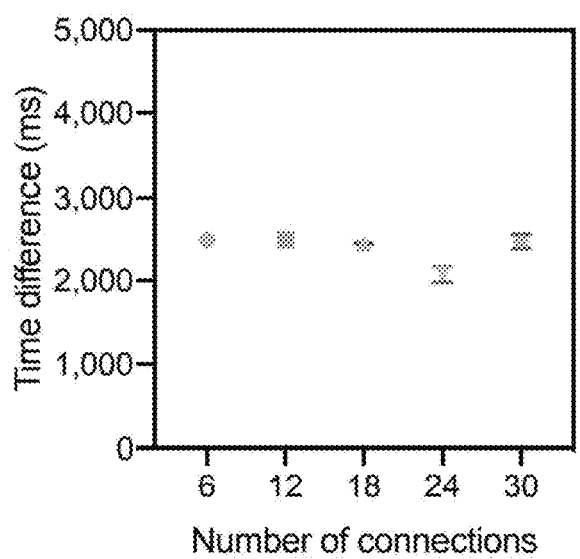
Figure 15C:
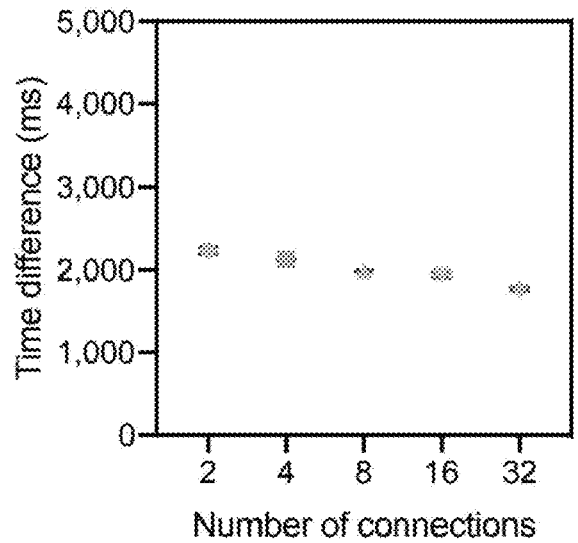
Figure 15D:
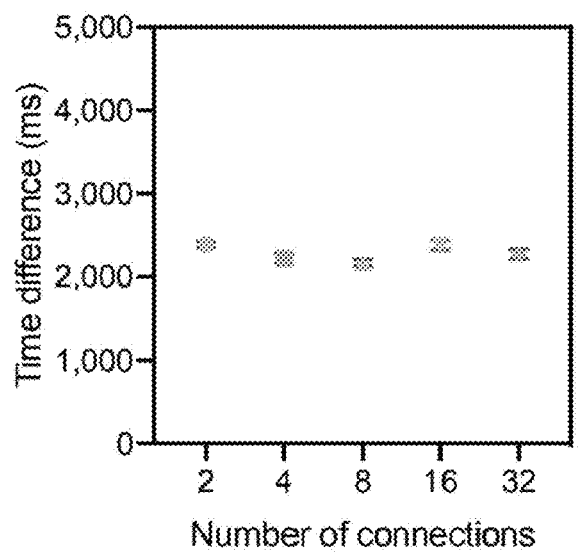

FIGS. 14A and 14B are graphs showing control channel consumption in Experimental Example 1, Comparative Example 1, and Comparative Example 2 for two topologies. Referring to FIGS. 14A and 14B, consumption increases in proportion to the number of connections because the monitoring of pfs increases with the number of connections. In linear topology of FIG. 14A, Experimental Example 1 improves the control channel consumption about 1.9 times, on average. In fat-tree topology of FIG. 14B, the average consumption of Experimental Example 1 is 1.44 times less than that of Comparative Example 1. This improvement is due to the advantage of the aggregated pCollector that merges multiple packet headers.

Comparing Experimental Example 1 and Comparative Example 1, Experimental Example 1 consumes 107% and 93% of control channel traffic in the linear and fat-tree topologies, respectively, which means that the consumption of Experimental Example 1 is considerably comparable to that of Comparative Example 2. In addition, in a fat-tree topology with few network connections, Experimental Example 1 is much better than Comparative Example 2. This is because Experimental Example 1 monitors only switches with pStatistics required for vStatistics. In FIG. 12B, there are 20 switches in the fat-tree topology, and multiple paths between each host pair are available. In this topology, when the number of connections is small, not all switches are used for packet forwarding, and so not for vStatistics. However, in Comparative Example 2, the virtual network controller monitors all switches in the physical network. Thus, request and reply messages are periodically disaggregated to control pCollector creation towards required physical flow entries. Therefore, pCollectors are created only for required physical flow entries, and thus statistics request/response messages are not created for switches not used.

3. Accuracy overhead: Time difference between vStatistics request time and vStatistics collection time of pCollectors, particularly, an average value with a 95% confidence interval, is measured and evaluated.

Experimental Example 1 successfully improves transmission delay and control channel consumption. The improvements come with the accuracy overhead inevitable because disaggregated transmission and pCollector aggregation incur time difference between when vStatistics requests come and when pCollector become available by pStatistics. FIGS. 15A to 15D are graphs showing time differences for the number of network connections in a linear and fat-tree topologies, plotted with average and 95% confidence interval. The results represent the average time difference for all cases of network connections are equal to or less than 2,500 ms in both topologies. This means that Experimental Example 1 replies to the virtual network controllers within 2.5 seconds, which is half the request interval of the virtual network controller. Therefore, the virtual network controller, at least, does not receive statistics from the previous statistics request, and therefore the accuracy overhead may not jeopardize the accuracy of vStatistics itself.

The network hypervisor according to embodiments of the inventive concept may provide the monitoring result for each virtual network to the tenant, perform the monitoring with the small delay, and reduce the total control channel consumption.

Although the embodiments of the inventive concept have been described above with reference to the accompanying drawings, it may be understood that those of ordinary skill in the art to which the inventive concept pertains to implement the inventive concept in other specific forms without changing the technical spirit or essential features. Therefore, it should be understood that the embodiments described above are illustrative in all respects and are not limiting.

What is claimed is:

1. A computing apparatus implemented with a network hypervisor implementing software defined network (SDN)-based network virtualization, the computing apparatus comprising:
   a statistics virtualization module configured to
      receive a request for individual physical resource consumption statistics for a first virtual network of multiple separately managed virtual networks;
      determine whether the at least one physical resource is shared between the first virtual network and at least one other of the multiple separately managed virtual networks, and
      isolatedly provide individual physical resource consumption statistics to the first virtual network based on the determination whether the at least one physical resource is shared;
   wherein the statistics virtualization module provides respective virtual flow entry statistics to the first virtual network, including:
   provision of virtual flow entry statistics for the first virtual network,
   provision of virtual port statistics based on the at least one physical resource for the first virtual network.

2. The computing apparatus of claim 1, wherein the respective virtual flow entry statistics include a packet count, a byte count, and a duration of installed flow entry for each of the multiple virtual networks, and wherein the respective virtual port statistics includes a total amount of transmitted/received packets for each of multiple virtual networks.

3. The computing apparatus of claim 1, wherein each of the respective virtual flow entry statistics are obtained by providing a flow entry of a corresponding edge switch instead of a corresponding physical switch where multiple virtual flow entries are mapped to one physical flow entry.

4. The computing apparatus of claim 1, wherein an individual edge switch is installed for each of the multiple separately managed virtual networks, and wherein the virtual flow entry statistics of the first virtual network are obtained by providing a first flow entry of a first edge switch for the first virtual network to the first virtual network.

5. The computing apparatus of claim 1, wherein, when a physical port is mapped to the first virtual port, the second algorithm targeting the first virtual port of the first virtual network includes consideration of the virtual flow entry statistics for the first virtual network.

6. The computing apparatus of claim 1, wherein each of the respective virtual port statistics obtain a total amount of transmitted/received packets for the corresponding virtual port, when a packet processed through the corresponding virtual flow entry is transmitted through the corresponding virtual port, using the respective virtual flow entry statistics.

7. The computing apparatus of claim 1, wherein each of the multiple separately managed virtual networks comprises a tenant network on a shared physical network.

8. A computing apparatus implemented with a network hypervisor implementing software defined network (SDN)-based network virtualization, the computing apparatus comprising:

a transmission disaggregation module including a physical statistics cache configured to perform periodic monitoring of a plurality of physical switches and store statistics of the physical switches collected, wherein the transmission disaggregation module calculates virtual statistics for each of multiple separately managed virtual networks that share the plurality of physical switches based on the physical statistics in the physical statistics cache and provides the virtual statistics to each of multiple separately managed virtual networks based on isolated requests for individual physical resource consumption statistics.

9. The computing apparatus of claim 8, wherein the transmission disaggregation module performs request interval estimation in which a request interval of a virtual network controller is calculated using a mean value and a variance value per physical flow.

10. A computing apparatus implemented with a network hypervisor implementing software defined network (SDN)-based network virtualization, the computing apparatus comprising:

a physical statistics aggregation module configured to respond, with statistics of a plurality of switches, to a single monitoring request for virtual statistics for at least one of multiple separately managed virtual networks that share the plurality of switches, wherein the physical statistics aggregation module performs;

physical statistics filter (pCollector filter) to determine an execution cycle of each of the physical statistics filter and physical statistics tuner; and physical statistics tuner (pCollector tuner) to give additional delay to a first execution of each pCollector.

11. The computing apparatus of claim 10, wherein the physical statistics filter further checks whether the physical statistics may be merged into one physical statistics for a specific physical switch, and wherein the physical statistics tuner determines a starting delay of the physical statistics.

12. A computing apparatus implemented with a network hypervisor implementing software defined network (SDN)-based network virtualization, the computing apparatus comprising:

a statistics virtualization module configured to isolatedly provide individual statistics to each of multiple separately managed virtual networks that simultaneously share a plurality of switches;

a transmission disaggregation module configured to include a physical statistics cache that performs periodic monitoring of the plurality of physical switches and store statistics of the physical switches collected; and a physical statistics aggregation module configured to respond, with statistics based on the plurality of physical switches, to a single monitoring request for virtual statistics for at least one of the multiple separately managed virtual networks.

* * * * *